US008312384B2

(12) United States Patent (10) Patent No.: US 8,312,384 B2
Gibson et al. (45) Date of Patent: Nov. 13, 2012

(54) APPARATUS AND METHOD FOR FAULT-TOLERANT PRESENTATION OF MULTIPLE GRAPHICAL DISPLAYS IN A PROCESS CONTROL SYSTEM

(75) Inventors: Adam Gibson, Sunnybank (AU); Ian Duncanson, Forster (AU); Ashley Noble, South Hobart (AU)

(73) Assignee: Honeywell International Inc., Morristown, NJ (US)

( * ) Notice: Subject to any disclaimer, the term of this patent is extended or adjusted under 35 U.S.C. 154(b) by 554 days.

(21) Appl. No.: 12/137,201

(22) Filed: Jun. 11, 2008

(65) Prior Publication Data

US 2009/0313569 A1 Dec. 17, 2009

(51) Int. Cl.
*G06F 3/048* (2006.01)
(52) U.S. Cl. ...................................................... 715/771
(58) Field of Classification Search .............. 715/788, 715/804, 806, 807, 771; 719/329
See application file for complete search history.

(56) References Cited

U.S. PATENT DOCUMENTS

| | | | |
|---|---|---|---|
| 4,574,364 A | 3/1986 | Tabata et al. | |
| 5,060,170 A | 10/1991 | Bourgeois et al. | |
| 5,091,866 A | 2/1992 | Takagi | |
| 5,386,503 A * | 1/1995 | Staggs et al. | 715/788 |
| 5,390,295 A * | 2/1995 | Bates et al. | 715/789 |
| 5,432,932 A * | 7/1995 | Chen et al. | 718/103 |
| 5,487,143 A | 1/1996 | Southgate | |
| 5,561,757 A | 10/1996 | Southgate | |
| 5,598,521 A * | 1/1997 | Kilgore et al. | 715/804 |
| 5,657,463 A | 8/1997 | Bingham | |
| 5,675,755 A | 10/1997 | Trueblood | |
| 5,734,380 A | 3/1998 | Adams et al. | |
| 5,745,759 A | 4/1998 | Hayden et al. | |
| 5,794,018 A | 8/1998 | Vrvilo et al. | |
| 5,796,403 A | 8/1998 | Adams et al. | |
| 5,825,357 A * | 10/1998 | Malamud et al. | 715/779 |
| 5,874,960 A * | 2/1999 | Mairs et al. | 715/733 |
| 5,880,725 A | 3/1999 | Southgate | |
| 6,002,400 A | 12/1999 | Loring et al. | |
| 6,031,530 A | 2/2000 | Trueblood | |

(Continued)

FOREIGN PATENT DOCUMENTS

JP 10063312 A 3/1998

(Continued)

OTHER PUBLICATIONS

Bergmans Mechatronics LLC, "Combustion Control System Technology", Mar. 15, 2008, http://web.archive.org/web/20080315014257/http://www.bergmans.com/Combustion%20Control%20System.html.*

(Continued)

*Primary Examiner* — Ryan Pitaro
*Assistant Examiner* — Ryan Barrett

(57) ABSTRACT

A method includes executing first processes to generate graphical displays. At least one graphical display includes a user interface associated with a process system. The method also includes executing a separate second process to generate a window for presentation to an operator. The method further includes inserting the graphical displays into the window and presenting the window with the graphical displays to the operator. The method could also include executing a separate third process to control the first and second processes. The third process could represent a watchdog that terminates and restarts processes in response to detecting a fault or that prioritizes the processes. The method could further include executing a separate fourth process to provide a service, which includes a function invoked on behalf of at least one of the first and second processes.

20 Claims, 5 Drawing Sheets

U.S. PATENT DOCUMENTS

| | | | |
|---|---|---|---|
| 6,297,823 | B1 | 10/2001 | Bharali et al. |
| 6,329,984 | B1* | 12/2001 | Boss et al. ............... 715/723 |
| 6,414,594 | B1 | 7/2002 | Guerlain |
| 6,452,935 | B1* | 9/2002 | Gibbs .......................... 370/439 |
| 6,456,334 | B1 | 9/2002 | Duhault |
| 6,489,975 | B1 | 12/2002 | Patil et al. |
| 6,509,915 | B2 | 1/2003 | Berman et al. |
| 6,570,595 | B2 | 5/2003 | Porter |
| 6,591,266 | B1 | 7/2003 | Li et al. |
| 6,678,867 | B2 | 1/2004 | Fong et al. |
| 6,721,223 | B2 | 4/2004 | Matsumoto et al. |
| 6,724,406 | B1 | 4/2004 | Kelley |
| 6,737,966 | B1 | 5/2004 | Calder |
| 6,760,048 | B1 | 7/2004 | Bates et al. |
| 6,850,257 | B1* | 2/2005 | Colleran et al. ............. 715/804 |
| 6,873,345 | B2 | 3/2005 | Fukuda et al. |
| 7,043,419 | B2 | 5/2006 | Chess et al. |
| 7,206,646 | B2 | 4/2007 | Nixon et al. |
| 7,299,409 | B2 | 11/2007 | Joshi et al. |
| 7,506,090 | B2* | 3/2009 | Rudnick et al. .............. 710/240 |
| 7,523,393 | B2 | 4/2009 | Joshi et al. |
| 7,703,022 | B2 | 4/2010 | Arthurs et al. |
| 7,707,318 | B2 | 4/2010 | Heller et al. |
| 7,802,229 | B2* | 9/2010 | Kornerup et al. ............ 717/109 |
| 7,849,403 | B2 | 12/2010 | Joshi et al. |
| 8,036,760 | B2* | 10/2011 | Mehta et al. .................. 700/29 |
| 2002/0112090 | A1* | 8/2002 | Bennett et al. ............... 709/319 |
| 2003/0007485 | A1* | 1/2003 | Venkitaraman et al. ...... 370/389 |
| 2003/0221141 | A1* | 11/2003 | Wenisch ....................... 714/47 |
| 2004/0061701 | A1* | 4/2004 | Arquie et al. ................. 345/440 |
| 2005/0091611 | A1* | 4/2005 | Colleran et al. ............. 715/804 |
| 2005/0149940 | A1* | 7/2005 | Calinescu et al. ........... 718/104 |
| 2005/0222835 | A1 | 10/2005 | Faist et al. |
| 2005/0256940 | A1 | 11/2005 | Henderson et al. |
| 2006/0056618 | A1* | 3/2006 | Aggarwal et al. .................. 380/1 |
| 2006/0064422 | A1 | 3/2006 | Arthurs et al. |
| 2006/0070008 | A1 | 3/2006 | Sauve et al. |
| 2007/0083813 | A1* | 4/2007 | Lui et al. ...................... 715/709 |
| 2007/0132779 | A1* | 6/2007 | Gilbert et al. ................ 345/619 |
| 2007/0142936 | A1* | 6/2007 | Denison et al. ................ 700/29 |
| 2007/0211079 | A1* | 9/2007 | Nixon et al. .................. 345/619 |
| 2008/0010608 | A1 | 1/2008 | Adams |
| 2008/0066004 | A1* | 3/2008 | Blevins et al. ............... 715/771 |
| 2008/0201642 | A1* | 8/2008 | Chong et al. ................. 715/736 |
| 2008/0209211 | A1* | 8/2008 | Grgic et al. .................. 713/166 |
| 2009/0157200 | A1* | 6/2009 | Hams ............................ 700/83 |
| 2009/0204232 | A1* | 8/2009 | Guru et al. ....................... 700/9 |
| 2009/0249367 | A1* | 10/2009 | Koniki et al. ................ 719/328 |
| 2010/0050103 | A1* | 2/2010 | Husoy et al. ................. 715/765 |
| 2010/0088627 | A1* | 4/2010 | Enkerud et al. .............. 715/777 |
| 2010/0107108 | A1* | 4/2010 | Husoy et al. ................. 715/777 |
| 2010/0271479 | A1* | 10/2010 | Heydlauf ..................... 348/143 |

FOREIGN PATENT DOCUMENTS

| | | |
|---|---|---|
| JP | 2006-215817 | 8/2006 |
| WO | WO 99/63430 A1 | 12/1999 |
| WO | WO 00/01007 A2 | 2/2000 |

OTHER PUBLICATIONS

Bergmans Mechatronics LLC, Combustion Control System GUI screenshot, Jan. 21, 2008, http://bergmans.com/Combustion%20Control%20System/GUI%20Screenshot.jpg.* sp3 Diamond Technologies, "Model 650 CVD Diamond Deposition System Description", Nov. 17, 2006, http://web.archive.org/web/20061117055821/http://www.sp3inc.com/reactor.htm.*

Sonja Keserovic, et al., "An Overview of Managed/Unmanaged Code Interoperability", 2008, 12 pages.

"HMIModule", 2003, 7 pages.

".NET Framework Developer's Guide, Application Domains", Nov. 2007, 9 pages.

Wikipedia, "Application Domain", Sep. 19, 2008, 1 page.

Scott M. Silver, "Implementation and Analysis of Software Based Fault Isolation", May 31, 1996, 32 pages.

Jack Gudenkauf, et al., "CLR Inside, .NET Application Extensibility", 2008, 4 pages.

David J. Cupitt, "Apparatus and Method for Isolating Problems in Content Loaded Into a Human-Machine Interface Application", U.S. Appl. No. 11/942,886, filed Nov. 20, 2007.

Office Action dated Jan. 27, 2012 issued in connection with U.S. Appl. No. 11/942,886.

* cited by examiner

APPARATUS AND METHOD FOR FAULT-TOLERANT PRESENTATION OF MULTIPLE GRAPHICAL DISPLAYS IN A PROCESS CONTROL SYSTEM

TECHNICAL FIELD

This disclosure relates generally to process control systems and more specifically to an apparatus and method for fault-tolerant presentation of multiple graphical displays in a process control system.

BACKGROUND

Processing facilities are often managed using process control systems. Example processing facilities include manufacturing plants, chemical plants, crude oil refineries, and ore processing plants. Among other operations, process control systems typically manage the use of motors, valves, and other industrial equipment in the processing facilities.

Conventional control systems often include graphical displays that provide operators with information about monitored processes. For example, graphical displays could allow operators to ensure proper operation of the monitored processes and to resolve problems with the monitored processes. Other types of graphical displays (such as human-machine interface or "HMI" view components) can augment these process control displays, such as when they are used to present information related to advanced process control or process optimization. A view component could be embedded within another graphical display, located in the same window as another graphical display, or located in its own window.

A problem in conventional control systems is that a fault in one graphical display can often interfere with the operation of other graphical displays. For example, a software fault in one view component could cause a failure in another view component or other graphical display. While managed code and application domains can be used in the MICROSOFT .NET FRAMEWORK to isolate non-user interface components, this typically cannot be used with user interfaces or with older or non-managed code.

SUMMARY

This disclosure provides an apparatus and method for fault-tolerant presentation of multiple graphical displays in a process control system.

In a first embodiment, a method includes executing a plurality of first processes to generate a plurality of graphical displays. At least one of the graphical displays includes a user interface associated with a process system. The method also includes executing a second process to generate a window for presentation to an operator, where the second process is separate from the first processes. The method further includes inserting the graphical displays into the window and presenting the window with the graphical displays to the operator.

In particular embodiments, executing the second process also generates one or more user interface mechanisms in the window, where the user interface mechanisms include a title bar, a toolbar, and/or a menu. Also, the window and the user interface mechanisms may remain visible to the operator when a fault occurs in one or more of the graphical displays.

In other particular embodiments, the method also includes executing a third process to control the first and second processes, where the third process is separate from the first processes and the second process. Executing the third process may include monitoring a status of each of the first and second processes, and terminating and restarting one of the processes in response to detecting a fault with the process. Executing the third process may also include monitoring an availability of system resources and prioritizing at least some of the first and second processes in response to detecting an inadequate availability of the system resources. The first processes could include view components generating the graphical displays, and prioritizing the first and second processes could include prioritizing the view components based on a relative importance of the view components.

In yet other particular embodiments, the method further includes executing a fourth process to provide a service, where the service includes a function invoked on behalf of at least one of the first and second processes. The fourth process is separate from the first, second, and third processes.

In still other particular embodiments, the second, third, and fourth processes form a framework. Also, the first processes are developed without any prior knowledge of the framework.

In additional particular embodiments, the method further includes passing first data from the second process to one or more of the first processes and passing second data from one or more of the first processes to the second process. The first and second data include operator inputs, and the operator inputs are passed between the processes transparently to the operator.

In a second embodiment, an apparatus includes a processor configured to execute a plurality of first processes to generate a plurality of graphical displays. At least one of the graphical displays includes a user interface associated with a process system. The processor is also configured to execute a second process to generate a window that includes the graphical displays, where the second process is separate from the first processes. The apparatus also includes a display interface configured to provide the window with the graphical displays to a display device for presentation to an operator.

In a third embodiment, a computer program is embodied on a computer readable medium. The computer program includes computer readable program code forming a plurality of first processes configured to generate a plurality of graphical displays. At least one of the graphical displays includes a user interface associated with a process system. The computer program also includes computer readable program code forming a second process configured to generate a window that includes the graphical displays, where the second process is separate from the first processes. In addition, the computer program includes computer readable program code configured to output the window with the graphical displays.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 4, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
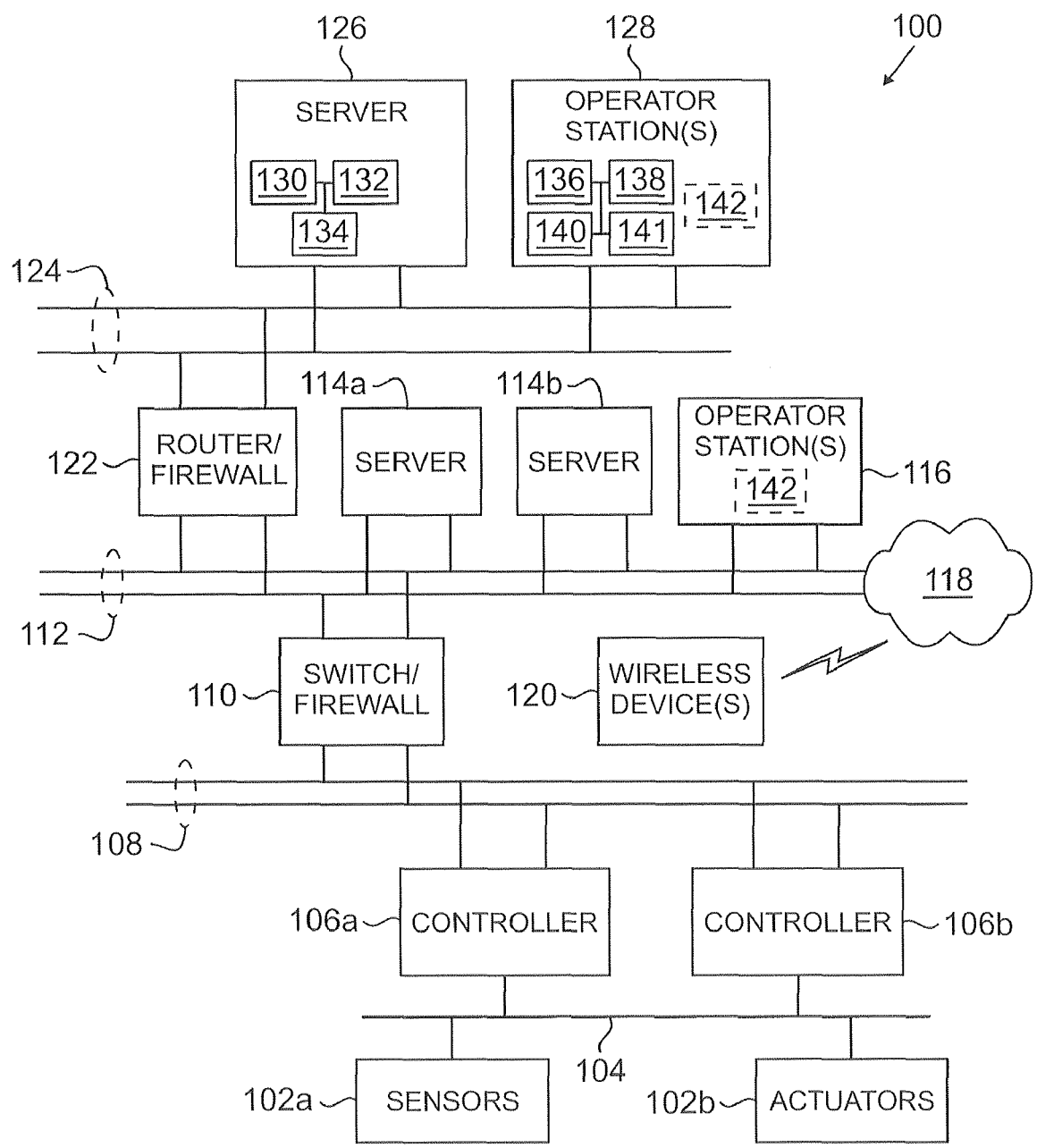
FIG. 1 illustrates an example process control system according to this disclosure.

FIG. 1 illustrates an example process control system 100 according to this disclosure. The embodiment of the process control system 100 shown in FIG. 1 is for illustration only. Other embodiments of the process control system 100 may be used without departing from the scope of this disclosure.

In this example embodiment, the process control system 100 includes various components that facilitate production or processing of at least one product or other material, such as one or more sensors 102a and one or more actuators 102b. The sensors 102a and actuators 102b represent components that may perform any of a wide variety of functions. For example, the sensors 102a could measure a wide variety of characteristics in a process system, such as temperature, pressure, or flow rate. Also, the actuators 102b could alter a wide variety of characteristics in the process system, such as heaters, motors, or valves. The sensors 102a and actuators 102b could represent any other or additional components. Each of the sensors 102a includes any suitable structure for measuring one or more characteristics in a process system. Each of the actuators 102b includes any suitable structure for operating on or affecting conditions in a process system. Also, a process system may generally represent any system or portion thereof configured to process one or more products or other materials in some manner.

At least one network 104 is coupled to the sensors 102a and actuators 102b. The network 104 facilitates interaction with the sensors 102a and actuators 102b. For example, the network 104 could transport measurement data from the sensors 102a and provide control signals to the actuators 102b. The network 104 could represent any suitable network or combination of networks. As particular examples, the network 104 could represent an Ethernet network, an electrical signal network (such as a HART or FOUNDATION FIELDBUS network), a pneumatic control signal network, or any other or additional type(s) of network(s).

Two controllers 106a-106b are coupled to the network 104. The controllers 106a-106b may, among other things, use the measurements from the sensors 102a to control the operation of the actuators 102b. For example, the controllers 106a-106b could receive measurement data from the sensors 102a and use the measurement data to generate control signals for the actuators 102b. Each of the controllers 106a-106b includes any hardware, software, firmware, or combination thereof for interacting with the sensors 102a and controlling the actuators 102b. The controllers 106a-106b could, for example, represent multivariable controllers or other types of controllers. As a particular example, each of the controllers 106a-106b could represent a computing device running a MICROSOFT WINDOWS operating system.

Two networks 108 are coupled to the controllers 106a-106b. The networks 108 facilitate interaction with the controllers 106a-106b, such as by transporting data to and from the controllers 106a-106b. The networks 108 could represent any suitable networks or combination of networks. As particular examples, the networks 108 could represent a pair of Ethernet networks or a redundant pair of Ethernet networks, such as a FAULT TOLERANT ETHERNET (FTE) network from HONEYWELL INTERNATIONAL INC.

At least one switch/firewall 110 couples the networks 108 to two networks 112. The switch/firewall 110 may transport traffic from one network to another. The switch/firewall 110 may also block traffic on one network from reaching another network. The switch/firewall 110 includes any suitable structure for providing communication between networks, such as a HONEYWELL CONTROL FIREWALL (CF9) device. The networks 112 could represent any suitable networks, such as a pair of Ethernet networks or an FTE network.

Two servers 114a-114b are coupled to the networks 112. The servers 114a-114b perform various functions to support the operation and control of the controllers 106a-106b, sensors 102a, and actuators 102b. For example, the servers 114a-114b could log information collected or generated by the controllers 106a-106b, such as measurement data from the sensors 102a or control signals for the actuators 102b. The servers 114a-114b could also execute applications that control the operation of the controllers 106a-106b, thereby controlling the operation of the actuators 102b. In addition, the servers 114a-114b could provide secure access to the controllers 106a-106b. Each of the servers 114a-114b includes any hardware, software, firmware, or combination thereof for providing access to, control of, or operations related to the controllers 106a-106b. Each of the servers 114a-114b could, for example, represent a computing device running a MICROSOFT WINDOWS operating system.

One or more operator stations 116 are coupled to the networks 112. The operator stations 116 represent computing or communication devices providing user access to the servers 114a-114b, which could then provide user access to the controllers 106a-106b (and possibly the sensors 102a and actuators 102b). As particular examples, the operator stations 116 could allow users to review the operational history of the sensors 102a and actuators 102b using information collected by the controllers 106a-106b and/or the servers 114a-114b. The operator stations 116 could also allow the users to adjust the operation of the sensors 102a, actuators 102b, controllers 106a-106b, or servers 114a-114b. In addition, the operator stations 116 could receive and display warnings, alerts, or other messages or displays generated by the controllers 106a-106b or the servers 114a-114b. Each of the operator stations 116 includes any hardware, software, firmware, or combination thereof for supporting user access and control of the system 100. Each of the operator stations 116 could, for example, represent a computing device running a MICROSOFT WINDOWS operating system.

In this example, the system 100 also includes a wireless network 118, which can be used to facilitate communication with one or more wireless devices 120. The wireless network 118 may use any suitable technology to communicate, such as radio frequency (RF) signals. Also, the wireless devices 120 could represent devices that perform any suitable functions. The wireless devices 120 could, for example, represent wireless sensors, wireless actuators, and remote or portable operator stations or other user devices.

At least one router/firewall 122 couples the networks 112 to two networks 124. The router/firewall 122 includes any suitable structure for providing communication between networks, such as a secure router or combination router/firewall. The networks 124 could represent any suitable networks, such as a pair of Ethernet networks or an FTE network.

In this example, the system 100 includes at least one additional server 126 coupled to the networks 124. The server 126 executes various applications to control the overall operation of the system 100. For example, the system 100 could be used in a processing plant or other facility, and the server 126 could execute applications used to control the plant or other facility. As particular examples, the server 126 could execute applications such as enterprise resource planning (ERP), manufacturing execution system (MES), or any other or additional plant or process control applications. The server 126 includes any hardware, software, firmware, or combination thereof for controlling the overall operation of the system 100.

One or more operator stations 128 are coupled to the networks 124. The operator stations 128 represent computing or communication devices providing, for example, user access to the servers 114a-114b, 126. Each of the operator stations 128 includes any hardware, software, firmware, or combination thereof for supporting user access and control of the system 100. Each of the operator stations 128 could, for example, represent a computing device running a MICROSOFT WINDOWS operating system.

In particular embodiments, the various servers and operator stations may represent computing devices. For example, each of the servers 114a-114b, 126 could include one or more processors 130 and one or more memories 132 for storing instructions and data used, generated, or collected by the processor(s) 130. Each of the servers 114a-114b, 126 could also include at least one network interface 134, such as one or more Ethernet interfaces. Also, each of the operator stations 116, 128 could include one or more processors 136 and one or more memories 138 for storing instructions and data used, generated, or collected by the processor(s) 136. Each of the operator stations 116, 128 could also include at least one network interface 140, such as one or more Ethernet interfaces. Each of the operator stations 116, 128 could further include at least one display interface 141 for interacting with a display device (such as a graphics interface to a CRT or LCD computer monitor).

In one aspect of operation, to facilitate monitoring and control over one or more processes, one or more of the operator stations 116, 128 may include a framework 142 for presenting various human-machine interface (HMI) view components or other graphical displays to operators. In general, any suitable graphical displays can be used with the framework 142, such as graphical displays that visually represent one or more processes (or portions thereof) being monitored and/or controlled by the operators. As a particular example, a graphical display could contain a process schematic that graphically illustrates the equipment used to perform a particular process. Any other suitable graphical displays with any other content could also be presented to an operator. Further, any suitable number of graphical displays could be presented at the same time, allowing operators to view various displays related to the monitored processes.

In accordance with this disclosure, various graphical displays provided by the framework 142 are implemented using their own processes, which helps to isolate the graphical displays so that a fault in one display has a reduced impact (if any) on other displays. Also, the framework 142 can seamlessly integrate the graphical displays within one or more windows, meaning multiple graphical displays executed in separate processes can be presented in a single window to an operator. Inter-process communications can be used to pass operator inputs between processes, so an operator may not be required to select a particular graphical display in order to provide input to that graphical display. From the perspective of the operator, the graphical displays integrated into a single window appear to come from a single process. Moreover, the framework 142 enables the graphical displays to be developed without any prior knowledge of the framework. The framework 142 may integrate the graphical displays (both user interface and non-user interface displays) without imposing any restrictions on the development technology used to construct the graphical displays. For instance, there may not be a requirement to develop displays using .NET managed code. In addition, the framework 142 can provide for the prioritization of certain graphical displays over other graphical displays, which may be useful in situations such as resource-bound environments (like those with low CPU availability).

In this way, a robust, fault-tolerant application environment is provided for graphical displays. Additional details regarding the framework 142 are provided below. The framework 142 includes any hardware, software, firmware, or combination thereof for isolating graphical displays and integrating the displays for operators. As a particular example, the framework 142 could use HMIWEB technology from HONEYWELL INTERNATIONAL INC. to generate and present graphical displays to operators. The HMIWEB technology uses hypertext markup language (HTML) and allows users to build process control displays (web pages) that are loaded onto operator stations 116, 128. The HTML displays may use INTERNET EXPLORER or other browser technology to extend the functionality of the web pages to allow process information to be displayed and to allow operators to control processes via the web pages. In particular embodiments, the framework 142 can operate within a larger system, such as within EXPERION systems from HONEYWELL INTERNATIONAL INC.

Although FIG. 1 illustrates one example of a process control system 100, various changes may be made to FIG. 1. For example, a control system could include any number of sensors, actuators, controllers, servers, operator stations, networks, and framework or other applications. Also, the makeup and arrangement of the process control system 100 in FIG. 1 is for illustration only. Components could be added, omitted, combined, or placed in any other suitable configuration according to particular needs. In addition, FIG. 1 illustrates one operational environment in which graphical displays can be isolated in separate processes and integrated for operators. This functionality could be used in any other suitable device or system.

Figure 2:
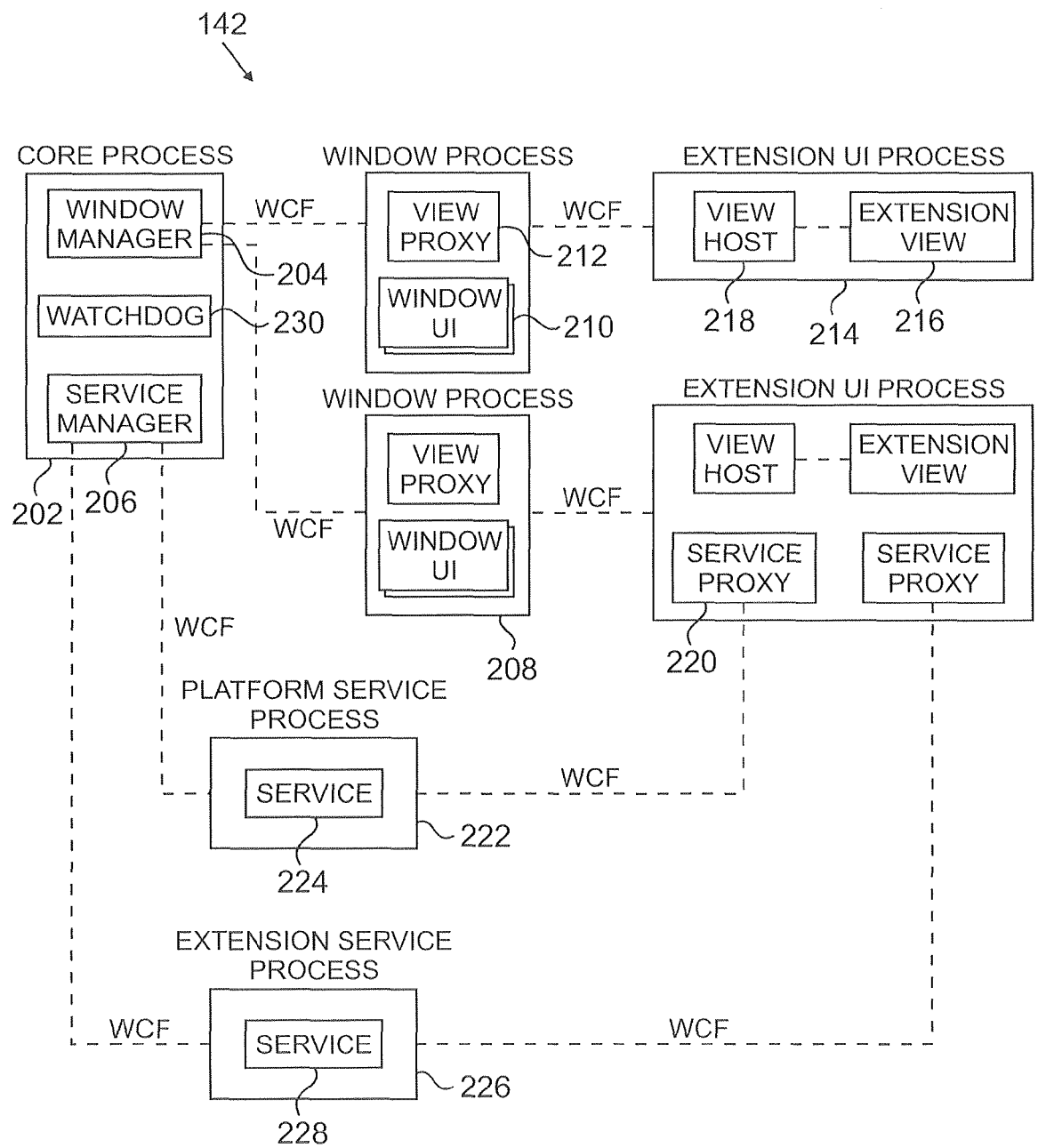
FIG. 2 illustrates an example framework for fault-tolerant presentation of multiple graphical displays in a process control system according to this disclosure.

FIG. 2 illustrates an example framework 142 for fault-tolerant presentation of multiple graphical displays in a process control system according to this disclosure. The embodiment of the framework 142 shown in FIG. 2 is for illustration only. Other embodiments of the framework 142 could be used without departing from the scope of this disclosure. Also, for ease of explanation, the framework 142 in FIG. 2 is described as operating in the system 100 of FIG. 1. The framework 142 could be used in any other suitable device or system.

As shown in FIG. 2, the framework 142 includes various processes that can be executed separately and communicate with one another. In this example, the process communications are based on the WINDOWS COMMUNICATION FOUNDATION (WCF) technology, although any other suitable inter-process communications could be used in the framework 142.

In this example, the framework 142 includes a core process 202, which represents the process controlling the overall operation of the framework 142. Within the core process 202 are a window manager 204 and a service manager 206. The window manager 204 controls the presentation of windows to an operator. A window generally represents a defined (often bounded) area in which one or more graphical displays can be presented to an operator. The window manager 204 could, for example, control the generation, presentation, and removal of windows on an operator station's display(s). Once a window is created, other elements in the framework 142 can populate the window with graphical displays. The window manager 204 includes any hardware, software, firmware, or combination thereof for controlling one or more windows presented on at least one display.

The service manager 206 controls one or more services provided in the framework 142. As described in more detail below, services represent functions (often common ones) that can be invoked by other elements of the framework 142 to provide desired functionality in the framework 142. In other words, the services represent functions made available to other elements of the framework 142, rather than being programmed directly into the other elements of the framework 142. The service manager 206 controls the use of these services in the framework 142. The service manager 206 includes any hardware, software, firmware, or combination thereof for controlling one or more services.

As shown in FIG. 2, the window manager 204 can create one or more window processes 208. Each window process 208 is associated with a different window presented on an operator station's display(s). For example, each window process 208 could generally be responsible for generating and presenting a window on a display and inserting graphical or other content into the window. In this example, each window process 208 includes one or more window user interfaces (UI) 210 and a view proxy 212. The window user interfaces 210 generate input/output (I/O) mechanisms in the window associated with the window process 208. For instance, the window user interfaces 210 could be used to generate a title bar, a menu, and a toolbar in the window associated with the window process 208. The window user interfaces 210 include any hardware, software, firmware, or combination thereof for generating and presenting one or more user I/O mechanisms.

The view proxy 212 allows one or more HMI view components or other graphical displays to be presented in the window associated with the window process 208. For example, the view proxy 212 could display one or more view components within a space that is not occupied by the title bar, menu, and toolbar of the window. The actual view components or other graphical displays are implemented as separate processes to help provide fault isolation between graphical displays. The view proxy 212 therefore allows a graphical display generated by a separate process to be presented in the window associated with the window process 208. The view proxy 212 includes any hardware, software, firmware, or combination thereof for presenting one or more graphical displays in a window.

In FIG. 2, two window processes 208 are present in the framework 142. This is for illustration only. Any suitable number of window processes 208 could be present at any given time in the framework 142. For example, one window process 208 could be present when an operator is viewing information in a single window, or more than two window processes 208 could be present when an operator is viewing information in more than two windows.

The framework 142 further includes one or more extension UI processes 214. The extension UI processes 214 are generally used to add graphical displays to the windows generated by the window processes 208. In this example, each extension UI process 214 includes an extension view 216 and a view host 218. The extension view 216 represents the element of the framework 142 actually generating a graphical display to be inserted into a window via the view proxy 212. The extension view 216 includes any hardware, software, firmware, or combination thereof for generating a graphical display. In particular embodiments, the extension view 216 can be implemented using WINFORM CONTROLS, WINDOWS PRESENTATION FOUNDATION (WPF) CONTROLS, or WIN32 CONTROLS from MICROSOFT CORPORATION. The view host 218 acts as an interface between the extension view 216 and the window process 208. The view host 218 allows the graphical display generated by the extension view 216 to be loaded by the window process 208. The view host 218 includes any hardware, software, firmware, or combination thereof for providing access to a graphical display.

The extension UI processes 214 could also include one or more service proxies 220. A service proxy 220 allows one or more services to be invoked and used by an extension UI process 214. For example, the service proxy 220 could request performance of a certain function on behalf of the extension UI process 214, and the results of the function could be returned to the service proxy 220 and used by the extension UI process 214 (such as to insert data into a graphical display). The service proxy 220 includes any hardware, software, firmware, or combination thereof for providing access to one or more external services or other functions.

In this example, two different types of services are provided in the framework 142. A platform service process 222 provides at least one service 224, and an extension service process 226 provides at least one service 228. The processes 222 and 226 are divided based on the types of services 224 and 228 implemented by the processes. The service 224 in the platform service process 222 may relate to operations of the core process 202 or window process 208 (such as a service related to the window user interface 210). The service 228 in the extension service process 226 may relate to operations of one or more extension UI processes 214. Each of the services 224 and 228 includes any hardware, software, firmware, or combination thereof for providing one or more functions to external components invoking the service.

As shown here, two extension UI processes 214 are present in the framework 142. This is for illustration only. Any suitable number of extension UI processes 214 could be present at any given time in the framework 142, such as when one extension UI process 214 is present for each view component being presented to an operator. Also, while two service processes 222 and 226 each having one service 224 and 228 are shown in FIG. 2, any suitable number of service processes could be used, and each service process could include any suitable number of services.

In addition, the core process 202 in this example includes a watchdog 230. The watchdog 230 generally monitors other elements of the framework 142 to identify problems with those elements, at which point the watchdog 230 could take suitable corrective action. For example, the watchdog 230 could periodically check the status of the window processes 208 and the extension UI processes 214. If a fault with one of the processes is found, the watchdog 230 can terminate and restart that process. Faults here could include (but are not limited to) software crashes, software exceptions, deadlocks, software resource depletion, or any other problem that could interfere with a process. The watchdog 230 could also periodically check system resource availability (such as CPU resource availability). If inadequate system resources are available, the watchdog 230 can prioritize certain graphical displays over other graphical displays. For instance, the watchdog 230 could prioritize the view components based on a relative importance of the view components. In this way, the watchdog 230 can help to ensure that more important graphical displays receive system resources, even if it is at the expense of less important graphical displays. The watchdog 230 includes any hardware, software, firmware, or combination thereof for monitoring and adjusting the operation of one or more processes.

In this example, the processes 202, 208, 214, 222, and 226 are implemented as separate executable processes. As a result, a fault with one process (such as a process 208 or 214) may not affect other processes (such as another process 208 or 214). As a particular example, a fault with a view component might not affect the operation of other view components (in the same window or in different windows). Similarly, a fault with one window might not affect the operation of other windows. Because of this, the framework 142 provides a generally fault-tolerant environment, where problems with views and windows may not affect all views and windows being used by an operator. This may be particularly useful when view components are provided by third-party vendors, where the third-party vendors' view components may suffer from faults or other problems. The framework 142 can help to ensure that faults caused by the third-party vendors' view components are limited to those view components and do not affect other graphical displays used by operators.

In addition, as noted above, various inter-process communications (such as WCF) can be used to transfer data between processes 202, 208, 214, 222, and 226 in the framework 142. Not only that, inter-process communications can be used to transfer data between elements of a single process 202, 208, 214, 222, or 226 (such as when the elements within the core process 202, the window process 208, or the extension UI process 214 are themselves separate processes). Among other things, the inter-process communications may allow keystrokes and commands received by the window processes 208 to be passed from the window processes 208 to the extension views 216 via cross-process calls. Similarly, events, commands, and keystrokes that are received by the extension views 216 (but that cannot be handled by the extension views) can be passed to the window processes 208 as needed. In this way, an operator need not select a particular window process or extension UI process before providing a command or keystroke for that process. The user inputs and other information can be passed between processes in a manner that is transparent to the operator.

Although FIG. 2 illustrates one example of a framework 142 for fault-tolerant presentation of multiple graphical displays in a process control system, various changes may be made to FIG. 2. For example, any suitable number of each process could be used in the framework 142, and each process in the framework 142 could include any suitable number of elements within that process.

Figure 3A:
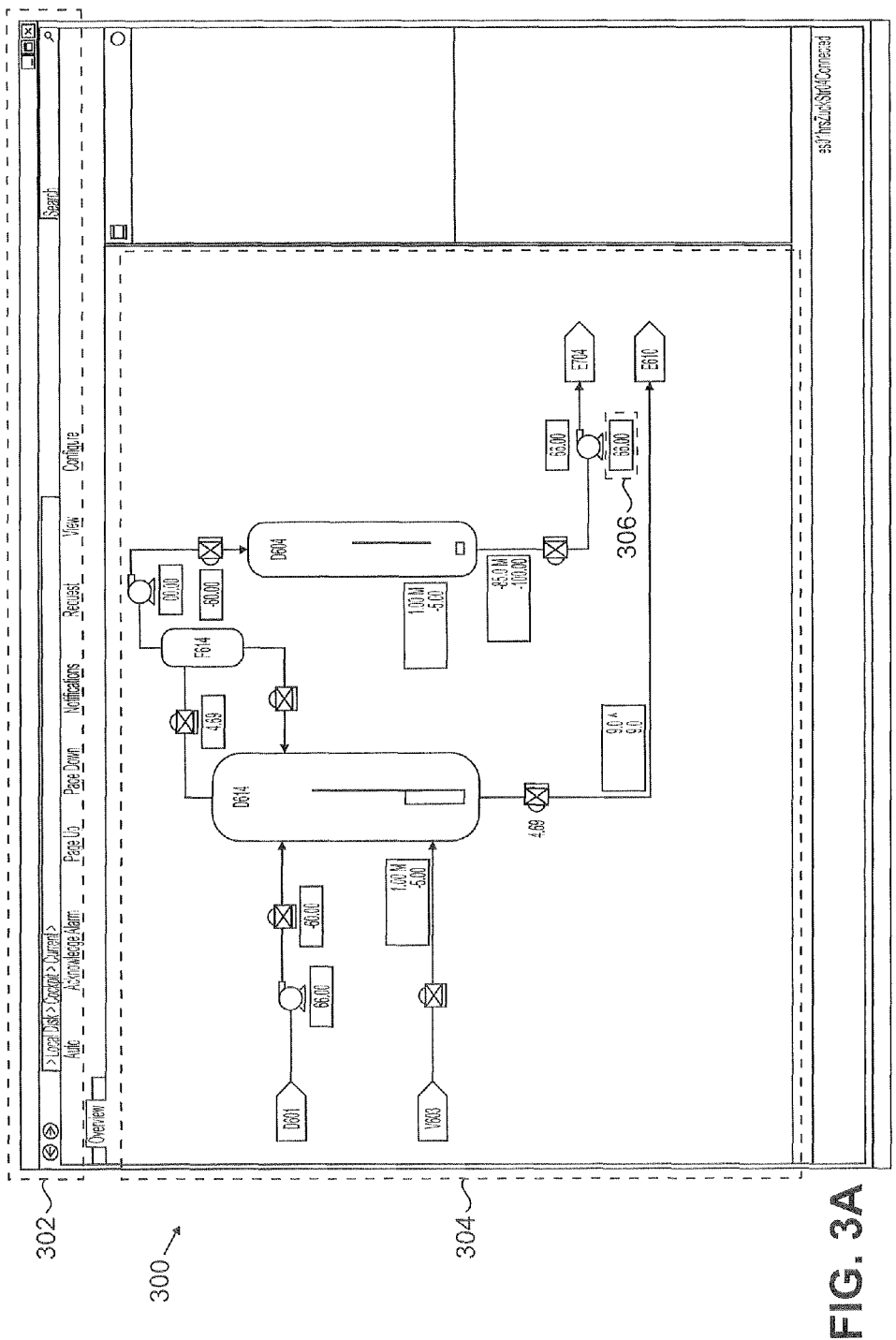
FIGS. 3A and 3B illustrate an example presentation of multiple graphical displays in a process control system according to this disclosure.
Figure 3B:
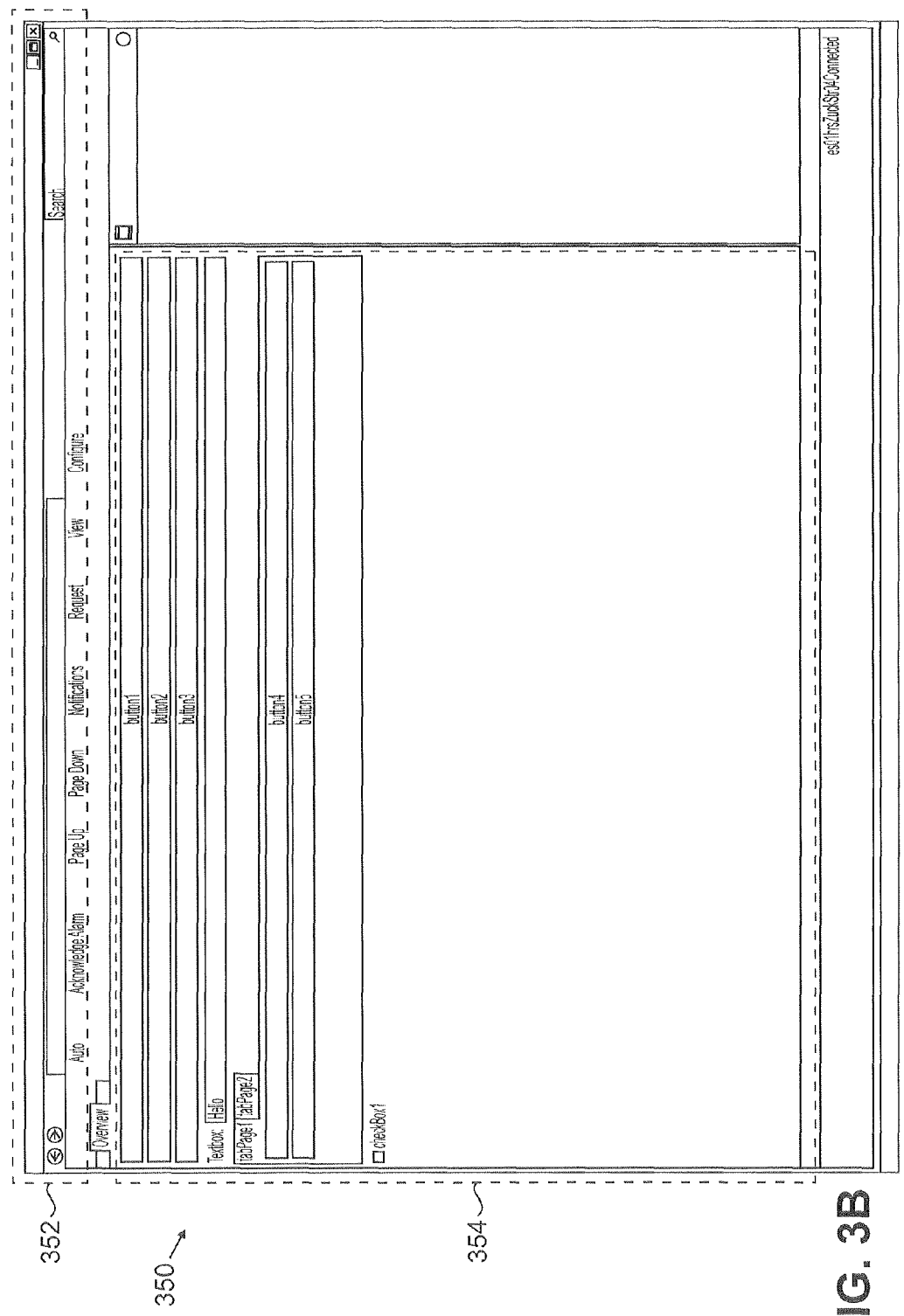

FIGS. 3A and 3B illustrate an example presentation of multiple graphical displays in a process control system according to this disclosure. In particular, FIGS. 3A and 3B illustrate example graphical displays that could be presented side-by-side on a single monitor or on separate monitors of an operator station. The example presentation shown in FIGS. 3A and 3B is for illustration only. Any other suitable graphical displays could be used and presented to an operator without departing from the scope of this disclosure. Also, for ease of explanation, the presentation shown in FIG. 3 is described as being generated by the framework 142 of FIG. 2. The framework 142 could present graphical displays in any other suitable manner.

In FIG. 3A, a window 300 generally defines an area where graphical displays are presented, and different contents of the window are provided by different processes in the framework 142. For example, one portion 302 of the window 300 may represent a graphical display created and provided by a window process 208. Another portion 304 of the window 300 may represent a graphical display created and provided by an extension UI process 214, meaning this content is defined by an extension view 216. A third portion 306 of the window 300 could contain data provided by a service, such as the service 228 in an extension service process 226. In FIG. 3B, a window 350 generally defines another area where graphical displays are presented, and different contents of the window 350 are provided by different processes in the framework 142. For example, one portion 352 of the window 350 may represent a graphical display created and provided by a second window process 208, and another portion 354 of the window 350 may represent a graphical display created and provided by a second extension UI process 214.

As can be seen in FIGS. 3A and 3B, each window 300 and 350 represents a single window with graphical displays and other contents from multiple processes. Because of this, when one view component suffers a fault or other problem, one area of a window 300 or 350 could be affected, but the remaining areas of the window may remain unaffected. Similarly, when one window 300 or 350 suffers a fault or other problem, the entire window 300 or 350 could be affected, but the other window may remain unaffected. This provides a level of fault tolerance in the presentation of information to operators, which can help to preserve at least partial views of a process when faults or other problems occur with graphical displays.

Although FIGS. 3A and 3B illustrate one example of a presentation of multiple graphical displays in a process control system, various changes may be made to FIGS. 3A and 3B. For example, any number of windows could be presented to an operator, and each window could have graphical displays from any suitable number of separate processes.

Figure 4:
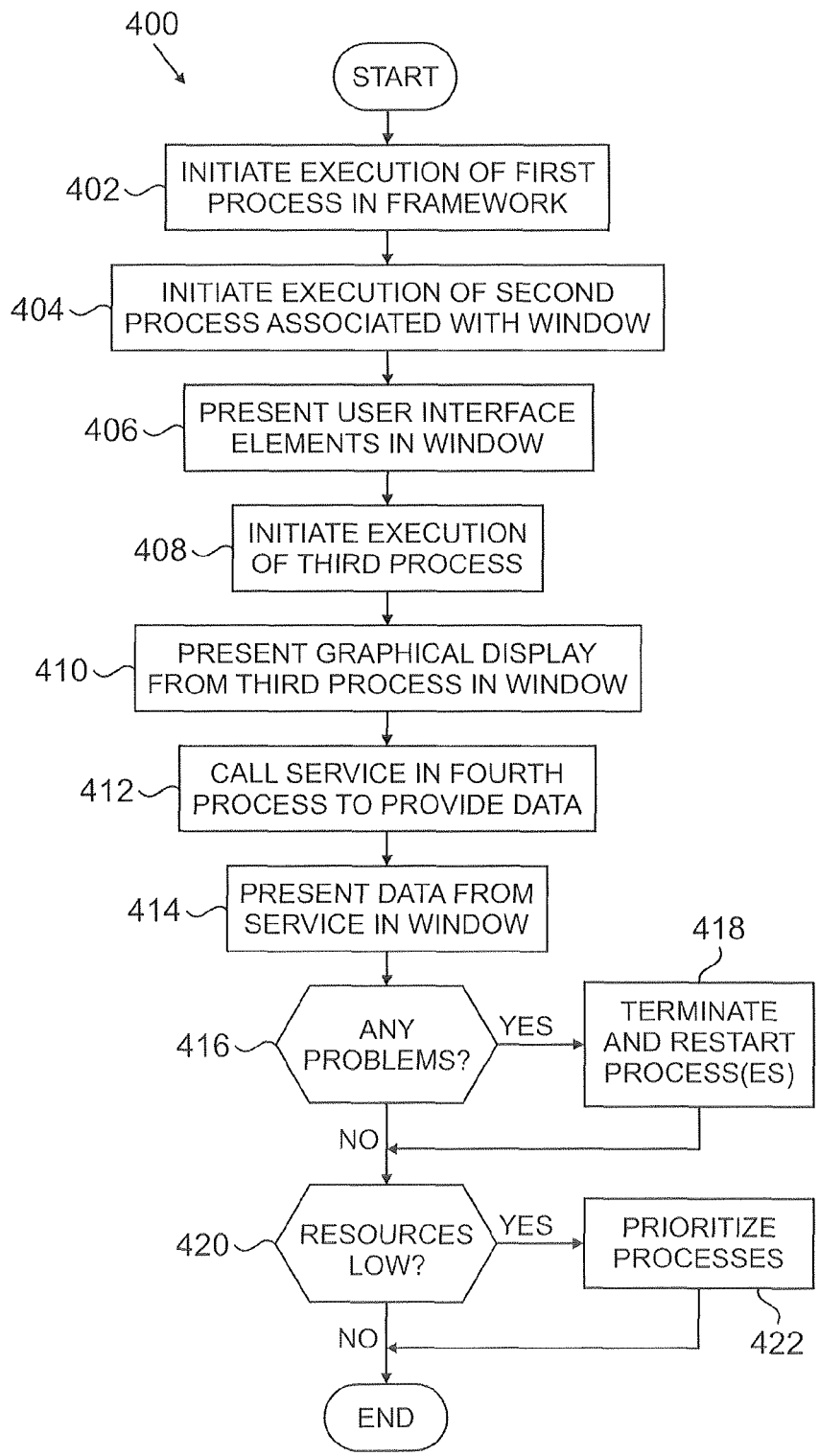
FIG. 4 illustrates an example method for fault-tolerant presentation of multiple graphical displays in a process control system according to this disclosure.

FIG. 4 illustrates an example method 400 for fault-tolerant presentation of multiple graphical displays in a process control system according to this disclosure. The embodiment of the method 400 shown in FIG. 4 is for illustration only. Other embodiments of the method 400 could be used without departing from the scope of this disclosure. Also, for ease of explanation, the method 400 is described as being performed by the framework 142 of FIG. 2. The method 400 could be used in any other suitable device or system.

Execution of a first process is initiated at step 402. This could include, for example, the processor in an operator station initiating execution of the core process 202. As a particular example, this could include the operator station initiating execution of the window manager 204, service manager 206, and watchdog 230.

Execution of a second process associated with a window is initiated at step 404. This could include, for example, the processor in the operator station initiating execution of a window process 208. As a particular example, this could include the window manager 204 initiating execution of a window process 208, such as in response to an operator opening a new window. One or more user interface elements are presented to the operator in the window at step 406. This could include, for example, generating a title bar, menu, and toolbar in the window using the window user interfaces 210.

Execution of a third process is initiated at step 408. This could include, for example, the processor in the operator station initiating execution of an extension UI process 214. As a particular example, this could include the operator station initiating execution of an extension view 216, a view proxy 218, and optionally one or more service proxies 220. A graphical display from the third process is presented in the window at step 410. This could include, for example, generating a graphical display by the extension view 216 and providing the generated graphical display to the view proxy 212 via the view host 218. This could also include the view proxy 212 inserting the generated graphical display into the window associated with the window process 208.

A service provided by a fourth process is called to provide specified data at step 412. This could include, for example, the service proxy 220 invoking a service 224 or 228 in a service process 222 or 226. The data from the service is presented in the window at step 414. This could include, for example, the extension UI process 214 providing the data to the extension view 216 for inclusion in a new graphical display or for updating of a current graphical display. The new or updated graphical display is then provided to the window process 208 for presentation.

A determination is made whether a problem exists with the processes at step 416. This could include, for example, the watchdog 230 determining if any process is suffering from a fault or other problem. If so, one or more of the processes can be terminated and restarted at step 418. In this way, the watchdog 230 can help to correct faults experienced by the processes. Also, a determination is made whether resources are low at step 420. This could include, for example, the watchdog 230 determining whether available CPU resources in an operator station have fallen below a threshold. If so, at least some of the processes are prioritized at step 422. This could include, for example, the watchdog 230 prioritizing the processes based on user-specified values or based on any other information. As a particular example, this could include the watchdog 230 prioritizing one window process 208 over another or one extension UI process 214 over another. The watchdog 230 could take other actions as well, such as terminating lower-priority processes or ensuring that available system resources are assigned first to higher-priority processes.

At this point, the method 400 ends, and various steps in FIG. 4 could be repeated. For example, steps 416-422 could be repeated as long as the graphical displays are presented to the operator. Also, various ones of steps 404-414 could be repeated when the operator invokes a new window, a new view, or a new service.

Although FIG. 4 illustrates one example of a method 400 for fault-tolerant presentation of multiple graphical displays in a process control system, various changes may be made to FIG. 4. For example, while shown as a series of steps, various steps in FIG. 4 could overlap, occur in parallel, occur in a different order, or occur multiple times.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The term "couple" and its derivatives refer to any direct or indirect communication between two or more elements, whether or not those elements are in physical contact with one another. The terms "application" and "program" refer to one or more computer programs, software components, sets of instructions, procedures, functions, objects, classes, instances, related data, or a portion thereof adapted for implementation in a suitable computer code (including source code, object code, or executable code). The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
executing a plurality of first processes to generate a plurality of graphical displays, at least one of the graphical displays comprising a schematic associated with a controller in a process control system;
executing a second process to generate a window for presentation to an operator, the second process separate from the first processes;
executing a third process to provide a service for the process control system, the third process separate from the first processes and the second process;
executing a fourth process to control the first, second, and third processes, the fourth process separate from the first processes, the second process, and the third process, wherein the second, third, and fourth processes are part of a single framework, the framework including a prioritization of a first of the graphical displays over a second of the graphical displays;
executing at least one extension user interface (UI) process to insert the graphical displays into the window, each of the at least one extension UI processes comprising an extension view and a view host;
presenting the window with the graphical displays to the operator;
passing first data from the second process to one or more of the first processes;
passing second data from one or more of the first processes to the second process, the first and second data comprising operator inputs, the operator inputs being passed between the processes transparently to the operator;
controlling the graphical displays by different ones of the first processes such that a fault in one of the graphical displays in the window does not affect presenting another of the graphical displays in the window; and
upon a determination of inadequate system resources, assigning a greater amount of system resources for the first graphical display than for the second graphical display based on the prioritization.

2. The method of claim 1, wherein executing the second process also generates one or more user interface mechanisms in the window, the user interface mechanisms comprising at least one of: a title bar, a toolbar, and a menu.

3. The method of claim 2, wherein the window and the user interface mechanisms remain visible to the operator when the fault occurs.

4. The method of claim 1, wherein executing the fourth process comprises:
monitoring a status of each of the first and second processes; and
terminating and restarting one of the processes in response to detecting the fault.

5. The method of claim 1, wherein executing the fourth process comprises:
monitoring the availability of the system resources.

6. The method of claim 5, wherein:
the first processes comprise view components generating the graphical displays; and
the prioritization comprises a prioritization of the view components based on a relative importance of the view components.

7. The method of claim 1, wherein the service comprises a function invoked on behalf of at least one of the first and second processes.

8. The method of claim 7, wherein:
the first processes are developed without any prior knowledge of the framework.

9. The method of claim 1, wherein executing the third process comprises:
invoking the third process by the at least one first process.

10. An apparatus comprising:
at least one processor configured to:
execute a plurality of first processes to generate a plurality of graphical displays, at least one of the graphical displays comprising a schematic associated with a controller in a process control system;
execute a second process to generate a window that includes the graphical displays, the second process separate from the first processes;
execute a third process to provide a service for the process control system, the third process separate from the first processes and the second process; and
execute a fourth process to control the first, second, and third processes, the fourth process separate from the first processes, the second process, and the third process, wherein the second, third, and fourth processes are part of a single framework, the framework including a prioritization of a first of the graphical displays over a second of the graphical displays;
execute at least one extension user interface (UI) process to insert the graphical displays into the window, each of the at least one extension UI processes comprising an extension view and a view host; and
a display interface configured to provide the window with the graphical displays to a display device for presentation to an operator;
wherein the graphical displays are controlled by different ones of the first processes such that a fault in one of the graphical displays in the window does not affect presenting another of the graphical displays in the window; and
wherein the at least one processor is further configured to:
pass first data from the second process to one or more of the first processes;
pass second data from one or more of the first processes to the second process, the first and second data comprising operator inputs, the operator inputs being passed between the processes transparently to the operator;
upon a determination of inadequate processor resources, assign a greater amount of processor resources for the first graphical display than for the second graphical display based on the prioritization.

11. The apparatus of claim 10, wherein the second process defines one or more user interface mechanisms to be included in the window, the user interface mechanisms comprising at least one of: a title bar, a toolbar, and a menu.

12. The apparatus of claim 11, wherein presentation of the window and the user interface mechanisms continues after the fault occurs.

13. The apparatus of claim 10, wherein the fourth process comprises a watchdog configured to:
monitor a status of each of the first and second processes; and
terminate and restart one of the processes in response to detecting the fault.

14. The apparatus of claim 10, wherein the fourth process comprises a watchdog configured to:
monitor the availability of the processor resources.

15. The apparatus of claim 10, wherein the service comprises a function invoked on behalf of at least one of the first and second processes.

16. The apparatus of claim 15, wherein:
the second process comprises a proxy configured to load the graphical displays into the window; and
the view host of each of the at least one extension UI processes is configured to interface with the proxy.

17. The apparatus of claim 16, wherein at least one of the first processes also comprises a second proxy configured to invoke the service.

18. The apparatus of claim 10, wherein the at least one processor is further configured to invoke the third process using the at least one first process.

19. A non-transitory computer readable medium embodying a computer program, the computer program comprising:
computer readable program code forming a plurality of first processes configured to generate a plurality of graphical displays, at least one of the graphical displays comprising a schematic associated with a controller in a process control system;
computer readable program code forming a second process configured to generate a window that includes the graphical displays, the second process separate from the first processes;
computer readable program code forming a third process configured to provide a service for the process control system, the third process separate from the first processes and the second process;
computer readable program code forming a fourth process configured to control the first, second, and third processes, the fourth process separate from the first processes, the second process, and the third process, wherein the second, third, and fourth processes are part of a single framework, the framework including a prioritization of a first of the graphical displays over a second of the graphical displays;
computer readable program code forming at least one extension user interface (UI) process to insert the graphical displays into the window, each of the at least one extension UI processes comprising an extension view and a view host;
computer readable program code configured to output the window with the graphical displays;
computer readable program code configured to pass first data from the second process to one or more of the first processes; and
computer readable program code configured to pass second data from one or more of the first processes to the second process, the first and second data comprising operator inputs, the operator inputs being passed between the processes transparently to the operator;

wherein the graphical displays are controlled by different ones of the first processes such that a fault in one of the graphical displays in the window does not affect presenting another of the graphical displays in the window; and wherein the computer program further comprises computer readable program code for, upon a determination of inadequate system resources, assigning a greater amount of system resources for the first graphical display than for the second graphical display based on the prioritization.

20. The computer readable medium of claim 19, wherein the service comprises a function invoked on behalf of at least one of the first and second processes.

* * * * *